(12) United States Patent
Walters et al.

(10) Patent No.: US 11,036,510 B2
(45) Date of Patent: Jun. 15, 2021

(54) PROCESSING MERGING PREDICATED INSTRUCTION WITH TIMING PERMITTING PREVIOUS VALUE OF DESTINATION REGISTER TO BE UNAVAILABLE WHEN THE MERGING PREDICATED INSTRUCTION IS AT A GIVEN PIPELINE STAGE AT WHICH A PROCESSING RESULT IS DETERMINED

(71) Applicant: Arm Limited, Cambridge (GB)

(72) Inventors: Karel Hubertus Gerardus Walters, Cambridge (GB); Chiloda Ashan Senarath Pathirane, Cambourne (GB)

(73) Assignee: Arm Limited, Cambridge (GB)

( * ) Notice: Subject to any disclaimer, the term of this patent is extended or adjusted under 35 U.S.C. 154(b) by 118 days.

(21) Appl. No.: 16/157,400

(22) Filed: Oct. 11, 2018

(65) Prior Publication Data
US 2020/0117457 A1    Apr. 16, 2020

(51) Int. Cl.
*G06F 9/30* (2018.01)
*G06F 9/38* (2018.01)

(52) U.S. Cl.
CPC ...... *G06F 9/30181* (2013.01); *G06F 9/30123* (2013.01); *G06F 9/3867* (2013.01)

(58) Field of Classification Search
CPC ............ G06F 9/30181; G06F 9/30123; G06F 9/3867; G06F 9/3836; G06F 9/30036; G06F 9/30072; G06F 9/3826
USPC ..................... 712/226, 8, 214, 218, 219, 224
See application file for complete search history.

(56) References Cited

U.S. PATENT DOCUMENTS

| | | | | |
|---|---|---|---|---|
| 6,430,679 B1* | 8/2002 | Heeb | ...................... | G06F 9/3828 712/218 |
| 6,728,869 B1* | 4/2004 | Mang | ..................... | G06F 9/3001 712/218 |
| 2010/0306504 A1* | 12/2010 | McDonald | ............ | G06F 9/3001 712/208 |
| 2013/0275728 A1* | 10/2013 | Toll | ........................ | G06F 9/3001 712/221 |
| 2015/0149744 A1* | 5/2015 | Pedersen | ............. | G06F 9/30036 712/7 |
| 2016/0357565 A1* | 12/2016 | Greenhalgh | .......... | G06F 1/3287 |

(Continued)

FOREIGN PATENT DOCUMENTS

WO    WO 2017/064456    *    9/2016    ............... G06F 9/30

*Primary Examiner* — Shawn Doman
(74) *Attorney, Agent, or Firm* — Nixon & Vanderhye P.C.

(57) ABSTRACT

A merging predicated instruction controls a processing pipeline to perform a processing operation to determine a processing result based on at least one source operand, and to perform a merging operation to merge the processing result with a previous value of a destination register under control of a predicate value identifying, for each of a plurality of portions of the destination register, whether that portion is to be set to a corresponding portion of the processing result or a corresponding portion of the previous value. The merging predicated instruction is permitted to be issued to the pipeline with a timing which results in the previous value of the destination register still being unavailable when the merging predicated instruction is at a given pipeline stage at which the processing result is determined. This can help to improve performance of subsequent instructions which are independent of the merging predicated instruction.

15 Claims, 7 Drawing Sheets

(56) References Cited

U.S. PATENT DOCUMENTS

2017/0212764 A1\* 7/2017 Lyberis ................ G06F 9/3838
2019/0377577 A1\* 12/2019 Park ...................... G06F 9/3836

\* cited by examiner

Op0: ADD Z3, Z5, Z6
Op1: NOT Z3, Pg/m, Z7    Op1 dependent on Op0
Op2: ADD Z8, Z3, Z9      Op2 dependent on Op1

Op0: ADD Z3, Z5, Z6
Op1: NOT Z3, Pg/m, Z7    Op1 dependent on Op0
Op2: ADD Z8, Z1, Z9      Op2 independent of Op1

Op0: ADD Z3, Z5, Z6
Op1: NOT Z3, Pg/m, Z7    Op1 dependent on Op0
Op2: ADD Z8, Z3, Z9    Op2 dependent on Op1

Op0: ADD Z3, Z5, Z6
Op1: NOT Z3, Pg/m, Z7    Op1 dependent on Op0
Op2: ADD Z8, Z1, Z9    Op2 independent of Op1

PROCESSING MERGING PREDICATED INSTRUCTION WITH TIMING PERMITTING PREVIOUS VALUE OF DESTINATION REGISTER TO BE UNAVAILABLE WHEN THE MERGING PREDICATED INSTRUCTION IS AT A GIVEN PIPELINE STAGE AT WHICH A PROCESSING RESULT IS DETERMINED

BACKGROUND

Technical Field

The present technique relates to the field of data processing.

Technical Background

Some processing pipelines may support at least one type of predicated instruction, which may control the processing pipeline to perform a processing operation to determine a processing result, and for which a predicate value specifies which portions of a destination register should be updated based on corresponding portions of the processing result. For example the predicated instruction may act on vector operands comprising multiple data elements and the predicate value may specify whether data elements of a vector are active or inactive. The portions of the processing result which correspond to inactive elements may not be written to the destination register.

SUMMARY

At least some examples provide an apparatus comprising: a processing pipeline comprising a plurality of pipeline stages for processing instructions; and issue control circuitry to control a timing with which a given instruction is issued for processing by the processing pipeline; in which: in response to a merging predicated instruction, the processing pipeline is configured to perform a processing operation to determine a processing result based on at least one source operand, and to perform a merging operation to merge the processing result with a previous value of a destination register under control of a predicate value identifying, for each of a plurality of portions of the destination register, whether that portion of the destination register is to be set to a corresponding portion of the processing result or a corresponding portion of the previous value; and the issue control circuitry is configured to permit the merging predicated instruction to be issued to the processing pipeline with a timing which results in the previous value of the destination register still being unavailable when the merging predicated instruction is at a given pipeline stage at which the processing result is determined.

At least some examples provide an apparatus comprising: means for pipelined processing comprising a plurality of pipeline stages for processing instructions; and means for controlling a timing with which a given instruction is issued for processing by the means for pipelined processing; in which: in response to a merging predicated instruction, the means for pipelined processing is configured to perform a processing operation to determine a processing result based on at least one source operand, and to perform a merging operation to merge the processing result with a previous value of a destination register under control of a predicate value identifying, for each of a plurality of portions of the destination register, whether that portion of the destination register is to be set to a corresponding portion of the processing result or a corresponding portion of the previous value; and the means for controlling is configured to permit the merging predicated instruction to be issued to the means for pipelined processing with a timing which results in the previous value of the destination register still being unavailable when the merging predicated instruction is at a given pipeline stage at which the processing result is determined.

At least some examples provide a data processing method, comprising: processing instructions using a processing pipeline comprising a plurality of pipeline stages; and controlling a timing with which a given instruction is issued for processing by the processing pipeline; in which: in response to a merging predicated instruction, the processing pipeline performs a processing operation to determine a processing result based on at least one source operand, and performs a merging operation to merge the processing result with a previous value of a destination register under control of a predicate value identifying, for each of a plurality of portions of the destination register, whether that portion of the destination register is to be set to a corresponding portion of the processing result or a corresponding portion of the previous value; and the merging predicated instruction is permitted to be issued to the processing pipeline with a timing which results in the predicate value still being unavailable when the merging predicated instruction is at a given pipeline stage at which the processing result is determined.

Further aspects, features and advantages of the present technique will be apparent from the following description of examples, which is to be read in conjunction with the accompanying drawings.

DESCRIPTION OF EXAMPLES

Figure 1:
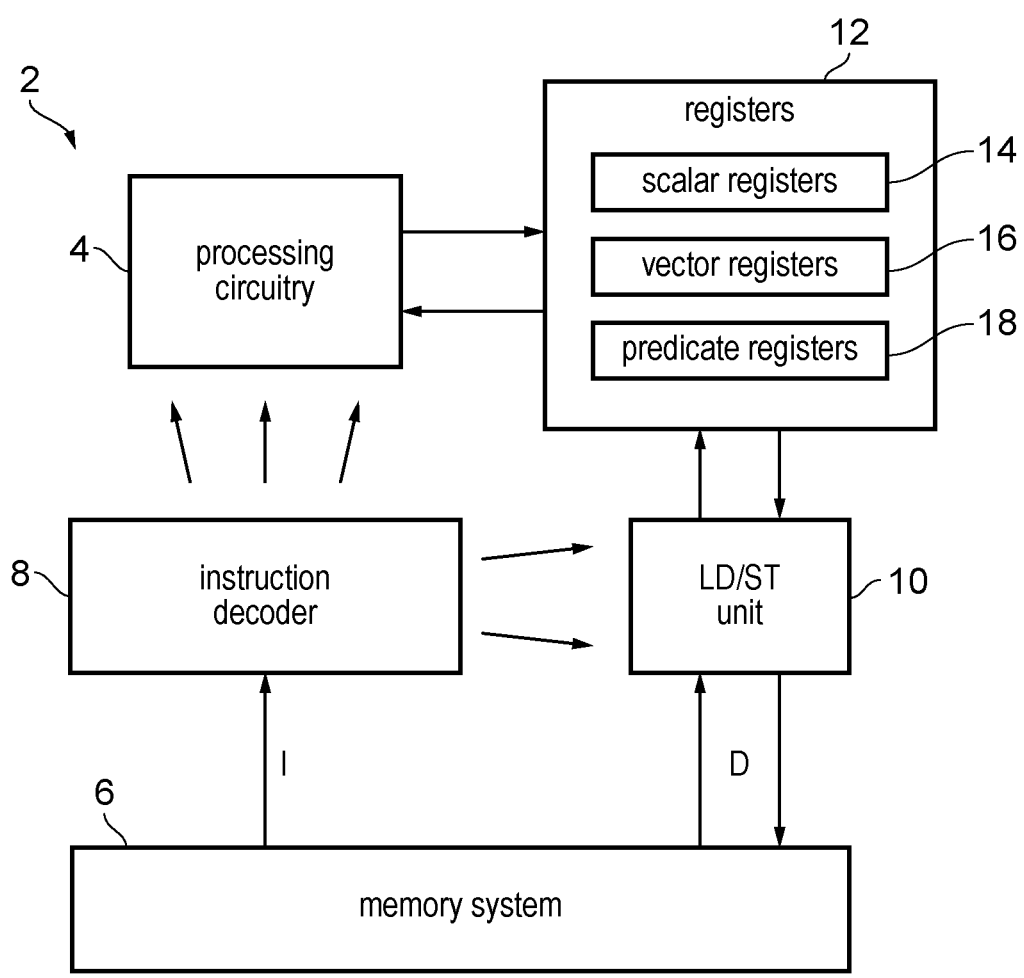
FIG. 1 schematically illustrates an example of a data processing apparatus.

For a predicated instruction, different options are available for controlling what value should be specified in an inactive portion of the destination register which is not being updated based on the processing result resulting from applying the corresponding processing operation to one or more operands. For example, for a zeroing predicated instruction, the inactive portions to the destination register are set to zero.

It is also possible to provide a merging predicated instruction, for which the processing pipeline may perform a processing operation to determine a processing result based on at least one source operand, and a merging operation to merge the processing result with a previous value of the destination register, under control of the predicate value. The predicate value may specify, for each of two or more portions of the destination register, whether to set that portion of the destination register to a corresponding portion of the processing result or to a corresponding portion of the previous value stored in the destination register. Hence, effectively the new processing result may be merged into the previous contents of the destination register under control of the predicate value.

For such a merging predicated instruction, the previous value in the destination register may effectively be treated as an additional source operand, similar to the at least one source operand used to generate the processing result, so that the merged value can be computed within the processing pipeline. Hence, in typical pipelines, it would be ensured that the merging predicated instruction cannot be issued until it is guaranteed that by the time the merging predicated instruction reaches a given pipeline stage at which the processing result will be determined, the previous value of the destination register is already available, so that the previous value can be merged with the processing result to generate the value to write back to the destination register (and so that the merged result can be forwarded to other instructions at as early a pipeline stage as possible). If it cannot be guaranteed that the previous value of the destination register will be available in time for the given pipeline stage, the merging predicated instruction may be held back from issue until a later cycle when the availability of the previous value of the destination register can be guaranteed.

However, the inventors recognised that in some cases performance may be improved by permitting the merging predicated instruction to be issued to the processing pipeline with a timing which results in the previous value of the destination register still being unavailable when the merging predicated instruction is at a given pipeline stage at which the processing result is determined. This approach may be seen as counter-intuitive since it may prevent the merged result of the instruction being forwarded to subsequent instructions from as early a pipeline stage, which one might expect would delay subsequent instructions from being processed. However, in fact the inventors realised that by issuing the merging predicated instruction earlier, this can improve performance since even without any early forwarding, subsequent instructions which are independent of the result of the merging predicated instruction can be issued and executed sooner, while subsequent instructions which depend on the merging predicate instruction are not delayed compared to alternative approach discussed above where the merging predicated instruction is held back from issue until the previous value of the destination register can be guaranteed to be available by the given pipeline stage. Therefore, average performance per instruction can be improved by permitting the merging predicated instruction to be issued even if its destination register will still be unavailable by the time the instruction reaches the given pipeline stage at which the processing result is determined.

This technique can be particularly useful for merging predicated instructions for which a given pipeline stage (at which its processing result is determined) is an earlier pipeline stage than a final pipeline stage with a processing pipeline. For example, there may be a number of types of merging predicated instructions corresponding to different types of arithmetic or logical operation performed as the processing operation to determine the processing result. Some forms of processing operation may be simpler than others and so may yield their result at an earlier pipeline stage than other forms of instruction. For example, a simple logical operation such as AND or NOT may require fewer pipeline stages to calculate the processing result than a more complex operation such as an add or multiply operation.

For instructions where the processing result is ready at a relatively early pipeline stage of the pipeline, one would normally expect that the instruction should be issued at a timing which ensures that by the time the instruction reaches that earlier pipeline stage, the destination register will be available so that the processing result can be merged into the destination register and the result forwarded to subsequent instructions.

However, with the approach discussed above, instead the issue may occur at a timing which results in the previous value of the destination register still being unavailable when the merging predicated instruction reaches the earlier pipeline stage at which the processing result is determined. In this case, while the processing result may be already available by the given pipeline stage, if the destination register is still unavailable then instead the control circuitry may control the processing pipeline to perform the merging operation at a subsequent pipeline stage to the given pipeline stage. Hence, the generation of the processing result and the merging operation may occur at different pipeline stages. While this may defer forwarding to later instructions (which cannot receive their source operand until the merging operation has been performed), nevertheless it can improve performance because by issuing the merging predicated instruction to the pipeline earlier than would have been the case if the issue control circuitry had to wait until a time at which it was guaranteed but the destination register would have been available at the given pipeline stage, this means that subsequent instructions which are independent of the merging predicate instruction can be issued earlier and are unaffected by any lack of early forwarding. This can help to eliminate pipeline bubbles in execution, and hence may improve performance.

The processing operation performed for the merging predicated instruction may be implemented in different ways. In one example, regardless of the value of the predicate, the pipeline could calculate the full processing result (assuming that all data elements are active, so that the entire processing result may be written to the destination register without any portions being masked out), but then after generating the full processing result, the predicate value may be used to mask out certain portions of the result during the merging operation so that only some portions of the destination register are updated with corresponding portions of the processing result, with other portions retaining the corresponding portions of the previous value of the destination register. In other examples, for the parts of the processing result that will be masked based on the predicate, the processing pipeline need not calculate those portions of the processing result at all, and in this case the processing pipeline may only generate those portions of the processing results which are not masked based on the predicate. Either of these approaches is within the scope of the technique discussed below.

The term "instruction" is used in this application to refer to instructions in the form encountered by the issue control circuitry. It will be appreciated that in some pipeline microarchitectures, program instructions fetched from memory (which may be defined according to a certain instruction set architecture) may be split into multiple micro-operations which are then passed to the issue control circuitry for separate issue to the processing pipeline. Hence, the term "instruction" discussed below is intended to encompass such micro-operations, as well as instructions which are issued for execution in the same form as in which they are defined in the instruction set architecture. In general, an "instruction" may be any set of control signals or bits of information which is used to control which processing operation the processing pipeline should execute.

The processing pipeline may support performing the merging operation at two or more different pipeline stages of the processing pipeline. Hence, the issue control circuitry may vary which of the pipeline stages is selected to perform the merging operation for the merging predicated instruction, depending on availability of the previous value of the destination register. This enables the merging to be performed at an earlier pipeline stage if the destination register can be available in time, in which case the overall result of the instruction may be available for forwarding to later instructions sooner. However, when the destination register will not be available in time for that earlier pipeline stage, the merging operation can be deferred until a later stage of the pipeline so that it is not necessary to defer the overall issue of the instruction, and instead the instruction may simply progress further down the pipeline before the merging is performed compared to cases when the destination register was available. Progressing the merging predicated instruction down the pipeline even if the previous value of the destination register is not available in time for the earlier pipeline stage helps to improve performance of subsequent independent instructions which can then also be issued sooner.

A forwarding network may be provided to forward a result value generated by the processing pipeline in response to a first instruction, for use as an input operand of a second instruction to be processed by the processing pipeline, to enable omission of a register read for reading the input operand of the second instruction from a register bank. In response to the merging predicated instruction, the issue control circuitry may control the forwarding network to disable any forwarding of the result value from an earlier pipeline stage than the pipeline stage selected for performing the merging operation for the merging predicated instruction. This ensures that subsequent instructions, which depend on the merged combination of the processing result and the previous value of the destination register, can obtain the correct merged value as their source operand.

More specifically, in response to the merging predicated instruction, the issue control circuitry may determine whether the previous value of the destination register will be available when the merging predicated instruction is at the given pipeline stage at which the processing result is determined. If the previous value of the destination register will be available when the merging predicated instruction is at the given pipeline stage, then the issue control circuitry may control the given pipeline stage to perform the merging operation for that instruction, and enable forwarding of the result value from the given pipeline stage by the forwarding network. On the other hand, if it is determined that the previous value of the destination register will be unavailable when the merging predicated instruction is at the given pipeline stage, the issue control circuitry may control a subsequent pipeline stage to perform the merging operation for the merging predicated instruction, and disable forwarding of the result value from the given pipeline stage by the forwarding network.

The subsequent pipeline stage which is used to perform the merging operation (in cases when the destination register is unavailable in time for the given pipeline stage) may be any subsequent pipeline stage later than the given pipeline stage. In some implementations it may be desirable to support the merging operation at two or more different subsequent pipeline stages after the given pipeline stage at which the processing result is available, and in this case the subsequent pipeline stage used to perform the merging operation may be the earliest pipeline stage at which the previous value of the destination register will be available by the time the merging predicated instruction reaches that stage of the pipeline.

However, in other examples, to avoid needing to support the merging operation at many different pipeline stages, the subsequent pipeline stage could simply be a final pipeline stage of the processing pipeline. Hence, in cases when the merging predicated instruction will not have its destination register available in time for the given pipeline stage, then the merging operation can be deferred to the final pipeline stage. This can reduce the circuit complexity of the pipeline. In some cases the final pipeline stage may be the stage that is responsible for writing the result of the instruction to the register bank.

In cases when the merging operation is performed at a subsequent stage of the pipeline to the given pipeline stage, the merging operation could be performed in different ways. In one approach, the merging operation may comprise reading the previous value of the destination register from a register bank, or obtaining the previous value of the destination register from the forwarding network, under control the predicate value merging the processing result determined by the given pipeline stage with the previous value read from the register bank or obtained from the forwarding network to generate a merging result, and writing the merging result to an entire register of the register bank. It may be relatively unusual to include additional reads of the register bank or inputs from the forwarding network at a late stage of the pipeline (normally most register reads or source operand inputs would be nearer the start of the pipeline). However, by including extra signal processing paths for receiving data values forwarded from the forwarding network or read from the register bank at a later stage of the pipeline at which the merging is performed, this can enable later merging in cases where the availability of the destination register is delayed, to improve performance by allowing the merging predicated instruction to issue earlier.

An alternative way of performing the merging operation may be that instead of writing the merged result to an entire register of the register bank, the merging operation may comprise writing one or more portions of the processing result determined by the given pipeline stage to corresponding portions of the destination register of the register bank, using the predicate value as a write enable value which controls enabling or disabling of writes to respective portions of the destination register in the register bank. In a typical processing pipeline supporting merging predicated operations, the merging would normally be performed within the pipeline itself so that the merged result is available within the pipeline and can be written to an entire register of the register bank (with any inactive elements effectively being overwritten with the same data value). However, by using the predicate value instead as a write enable value which controls whether each portion of the register bank is actually written to, this can avoid the need to re-read the previous value of the destination register.

In some implementations, a similar approach can be used for the predicate value as discussed for the destination register above, so that the issue control circuitry may also permit the merging predicated instruction to be issued to the processing pipeline with a timing which results in the predicate value still being unavailable when the merging predicated instruction is at the given pipeline stage at which the processing result is determined. Hence, similar to the features discussed above, the varying of which pipeline stage performs the merging operation, and the decision on whether to enable or disable forwarding from the given pipeline stage, may depend on the timing of availability of the predicate value (in addition to depending on the timing of availability of the destination register).

However, in other implementations the issue control circuitry may prohibit issuing of the merging predicated instruction to the processing pipeline in cases where the predicate value would still be unavailable when the merging predicated instruction reaches the given pipeline stage. In some cases, the control logic of the pipeline (e.g. control logic for controlling the operand forwarding on the forwarding network, the selection of which stage should perform the merging, and the timing of issue of the merging predicated instruction) may be simpler if the issue timing is controlled so that the predicate value is always available in time for the given pipeline stage. This can help to reduce circuit area, power and complexity. In practice, predicate values tend to be updated less often than destination registers, so the cost of any additional logic required to enable early issue of merging predicated instructions in cases when the predicate value would not be available in time for the given pipeline stage may be less justified than the corresponding logic for controlling the pipeline operation based on availability of the destination register.

The techniques discussed above can be applied to either an in-order pipeline which performs in-order processing of instructions, or to an out-of-order pipeline which performs out-of-order processing of instructions. For example, in an out-of-order pipeline which has a relatively short look ahead window (number of younger instructions which can bypass an older instruction), it can be beneficial to use the approach discussed above to enable some pipeline bubbles to be eliminated in cases where there are no suitable instructions in the look ahead window which can bypass the merging predicated instruction.

However, in practice, for an out-of-order pipeline, often even if the merging predicated instruction is delayed due to unavailability of its destination register, the "bubble" that would otherwise be created by the delay to the merging predicated instruction can often be filled with a subsequent instruction which is independent of the merging predicated instruction, so the added logic for controlling the enabling/disabling of early forwarding, variation in issue timing and variation of the pipeline stage which performs the merging, may not be justified in some out-of-order pipelines.

Hence, the technique discussed above may be particularly useful for an in-order pipeline for which, when one instruction is stalled, there is no opportunity to execute a later instruction in the program order ahead of the stalled instruction. Hence, the technique discussed above may be particularly effective for an in-order pipeline to eliminate bubbles in execution.

FIG. 1 schematically illustrates an example of a data processing apparatus 2 having processing circuitry 4 for performing data processing operations in response to instructions. The instructions are fetched from a memory system 6 (which may include one or more caches as well as main memory), and decoded by an instruction decoder 8 to generate control signals for controlling the processing circuitry 4 and a load/store unit 10 to perform their respective operations. The control signals generated by the instruction decoder may include representations of the instructions themselves, or micro-operations which may correspond to individual parts of the operation performed by a given instruction, or any other set of control signals or bits of information which controls the relevant execution units to perform the processing operations represented by the decoded instructions.

In response to a given instruction, the processing circuitry 4 may read one or more source operands from registers 12, perform processing operations based on the source operands to generate a processing result, and write back to the registers 12 the processing result, or a value derived from the processing result (e.g. a merged result as discussed below). The load/store unit 10 may control transfers of data between the memory system 6 and the registers 12, in response to load instructions or store instructions. Load instructions control the load/store unit 10 to load data from the memory system 6 and write the loaded data to the registers 12, while store instructions control the load/store unit 10 to read data from the registers 12 and write them back to the memory system 6.

The registers 12 may include a number of different types of registers, including scalar registers 14 for storing scalar operands, vector registers 16 for storing vector operands comprising multiple independent data elements, and predicate registers 18 for storing predicate values for controlling masking of portions of vector operations performed on the vector operands.

It will be appreciated that FIG. 1 is a simplified example of some components of a data processing system, and many other components not shown for conciseness may also be included.

Figure 2:
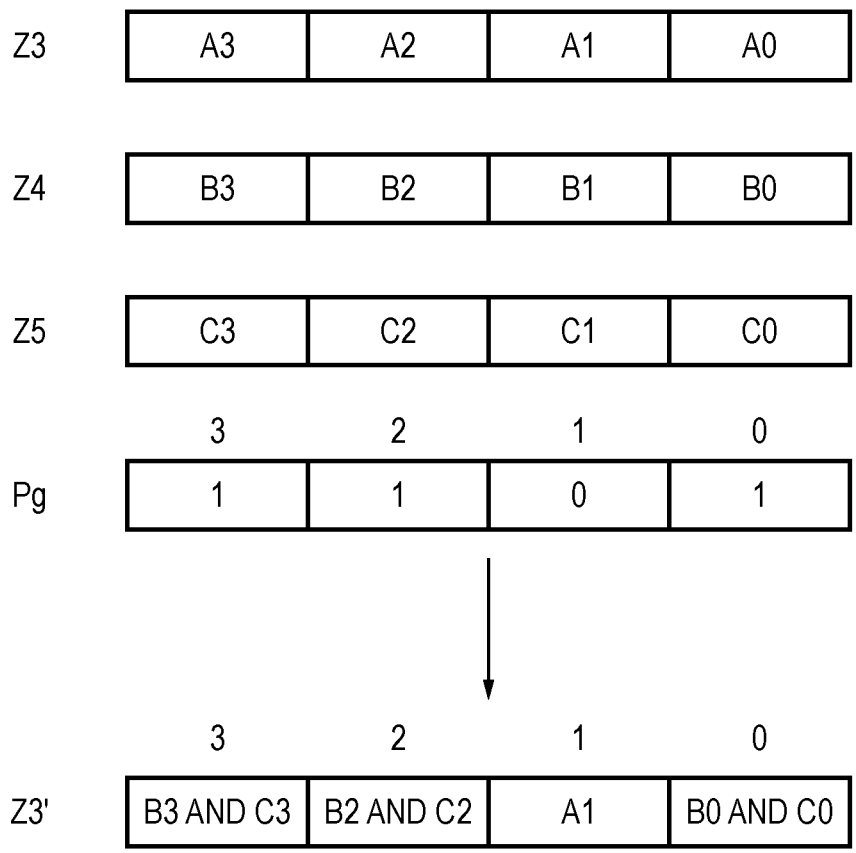
FIG. 2 illustrates an example of a merging predicated instruction.

FIG. 2 shows an example of a merging predicated instruction which uses a predicate value specified in a predicate register Pg of the predicate register file 18 to control masking of portions of a vector operation. In this example, the instruction is a vector AND instruction for performing a logical AND operation on respective pairs of elements stored in two vector registers Z4, Z5, and merging the processing results of the vector AND operation into the destination register Z3 under control of the predicate value stored in the predicate register Pg. In this example the predicate value is 1 in the fields corresponding to active data elements 0, 2 and 3 and is 0 in fields corresponding to inactive data element 1. Therefore, in the destination register Z3, the active elements 0, 2 and 3 are set to the logical AND of the corresponding pairs of elements (B0, C0; B2, C2; or B3, C3) of the source registers Z4, Z5. In contrast for the inactive element 1 of the destination register Z3, the previous value μl stored in the corresponding portion of the register is retained.

FIG. 2 shows an example of an AND instruction which uses merging predication, but it will be appreciated that many other types of instructions may also be supported by the processing circuitry 4 which use merging predication, but apply a different logical or arithmetic operation to the source operands. For some merging predicated instructions there may only be one source operand. For example, a NOT instruction may specify a single source operand and apply a logical NOT operation (i.e. an inversion of all the bits) to each individual element of the source register, and then merge the result with the contents previously stored in the destination register based on the predicate value.

In addition to such merging predicated instructions, the processing circuitry 4 could also support zeroing predicated instructions for which the inactive elements of the destination register are set to 0 instead of retaining the previous value stored in those portions of the destination register.

It is not essential for the predicate value to be identified in a predicate register Pg referenced by the merging predicated instruction. In some architectures there may only be a single predicate register provided, in which case the predicate value could be implicitly identified as the value stored in that single predicate register, based on the fact that the instruction opcode or another field of the instruction identifies that this is a predicated instruction.

Figure 3:
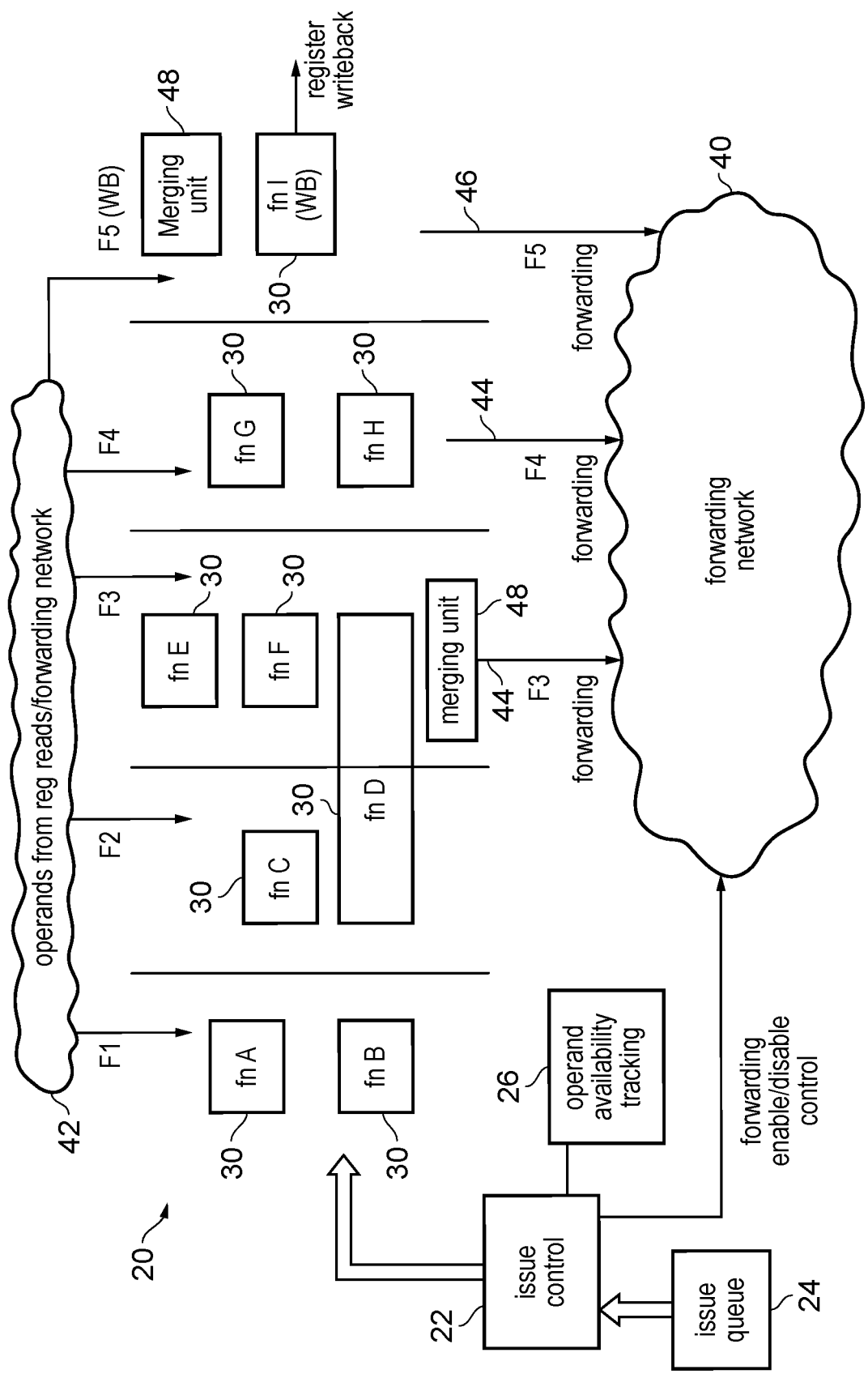
FIG. 3 shows an example of a processing pipeline and issue control circuitry.

FIG. 3 shows an example of a processing pipeline 20 which may be provided in the processing circuitry 4, as well as issue control circuitry 22 for controlling when instructions (including micro-operations) can be issued to the pipeline 20 for processing. The instructions awaiting processing may be queued within an issue queue 24. Operand availability tracking circuitry 26 (which is shown as separate from the issue control circuitry 22 in FIG. 3, but could also be considered part of the issue control circuitry) may track when operands required for instructions are available, depending on progress of earlier instructions, and the issue control circuitry 22 may control the timing at which a given instruction is issued based on the operand availability. For a merging predicated instruction, the timing of availability of the destination register of the instruction may be tracked by the operand availability tracking circuitry 26, in addition to any source registers, since the previous value of the destination register may be required for merging with the processing result of the merging predicated instruction.

As shown in FIG. 3, the pipeline 20 may have a number of pipeline stages, in this example five pipeline stages labelled F1 to F5. It will be appreciated that a 5-stage pipeline is just one example, and other pipelines may have different numbers of stages. The pipeline 20 includes a number of functional units 30 which are provided at respective pipeline stages to perform various functions. The particular purpose of each functional unit 30 may be highly dependent on the particular set of instructions which the pipeline is designed to support. Hence, while FIG. 3 shows a particular arrangement of functional units, this is just one example and the functional units provided in practice may be variable from one implementation to another. Some functional units, such as fn D shown stages F2 and F3 of FIG. 3, may span several pipeline stages and their operation may take more than one cycle to complete. In some pipeline stages there may be more functional units provided than others. In this example, the final pipeline stage F5 acts as a writeback stage which includes a functional unit, fn I (WB), which is responsible for writing the result of the instruction back to the registers 12. The other functional units 30 could perform a range of processing functions, such as addition, multiplication, logical operations such as AND or NOT, and other operations such as address computations for computing the address of load/store instructions to be processed by the load/store unit 10, or permutation operations for rearranging the position of data values or packing/unpacking vectors. It will be appreciated that a wide range of different types of functional unit can be provided.

As shown in FIG. 3, a forwarding network 40 may be provided for forwarding results generated by an earlier instruction, for use as a source operand in a later instruction. While each instruction may generate a result which is written back to the register file 12 at pipeline stage F5, it can be relatively common for a given instruction to generate a processing result which may be needed by another instruction which may be processed soon afterwards, in which case the forwarding network 14 may simply route the result generated by one instruction to the relevant pipeline stage at which that source operand will be needed for the later instruction, to bypass the register file 12 so that the corresponding register read for the later instruction can be omitted to save power. Hence, at each pipeline stage at which operands may be required, the operands may be input on input paths 42 which may provide operands either from the forwarding network 40 or from the register file 12.

In this example the processing pipeline is an in-order pipeline, in which the instructions to be processed are queued in the issue queue in an order corresponding to the program order in which they appeared in the program code stored in the memory system 6, and in which if a given instruction is stalled, it is not possible to allow a later instruction in the program order to bypass the stalled instruction. However, other implementations may apply similar techniques to an out-of-order pipeline in which reordering of the execution order of the instructions compared to their program order is permitted.

Different types of instructions may have their processing result available at different stages of the processing pipeline 20. For example some instructions, such as a NOT instruction or an AND instruction, may have their results available by pipeline stage F3, while more complex instructions such as an add or multiply instruction may not have their results available until stage F4 or F5. Hence, the forwarding network 40 may have some early forwarding paths 44 which enable some processing results to be forwarded earlier out of the pipeline than the forwarding path 46 coming from the final pipeline stage F5. A merging unit 48 may be provided at different pipeline stages 20 to support merging of the generated processing result with the previous value stored in a destination register, in response to a merging predicated instruction. In this example, the merging unit 48 is provided at stages F3 and F5. Hence there are multiple stages which could be selected for performing the merging operation. This merging operation cannot be performed until the previous value of a destination register is available and the predicate value for the merging predicated instruction is also available. In the example of FIG. 2, for example, the merging operation requires the values in registers Z3 and Pg to be available, in addition to the processing result derived from processing of registers Z4, Z5.

For a merging predication instruction for which the processing operation is relatively complex so that its result is not available until the final pipeline stage F5, then the merging unit 48 in stage F5 may be used, and the result forwarded to subsequent instructions using forwarding path 46 from stage F5.

However, for merging predicated instructions for simpler processing operations (such as AND or NOT), for which the processing result is available earlier e.g. at stage F3, one would normally expect that the merging unit 48 at stage F3 which generates the processing result should be used to perform the merging operation, so that the earliest possible pipeline stage can forward the result to subsequent instructions. However, as shown in the pipeline timing diagrams of FIGS. 4 and 5, this could cause delays in processing some instructions, because if the merging predicated instruction which has its processing result available by stage F3 is always controlled to use the merging unit 38 at that same pipeline stage F3, then this implies that the issue control circuitry 22 would need to defer issuing the instruction until a timing at which it can be guaranteed that both the destination register and the predicate value of the instruction will be ready in time for the instruction reaching stage F3.

Figure 4:
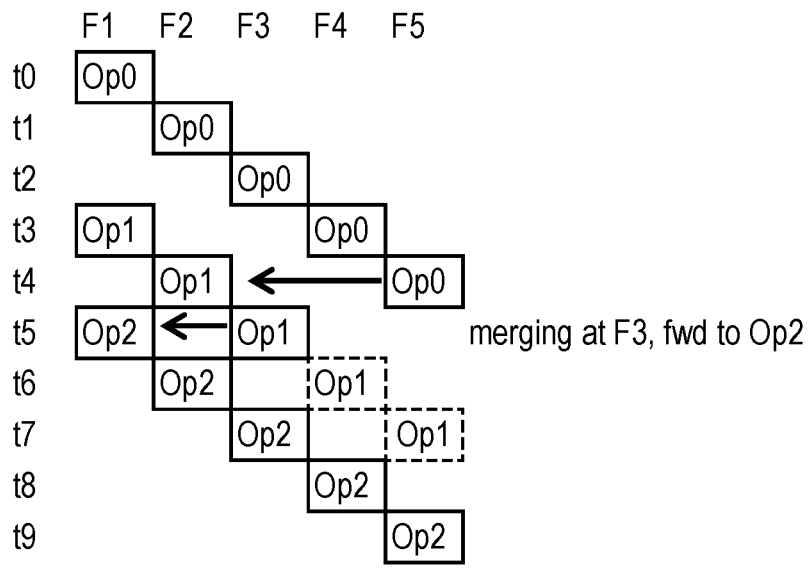
FIGS. 4 and 5 show comparative examples of timing control where a merging predicated instruction is prevented from being issued until it can be guaranteed that the destination register will be available at the pipeline stage where the processing result of the instruction is determined.
Figure 5:
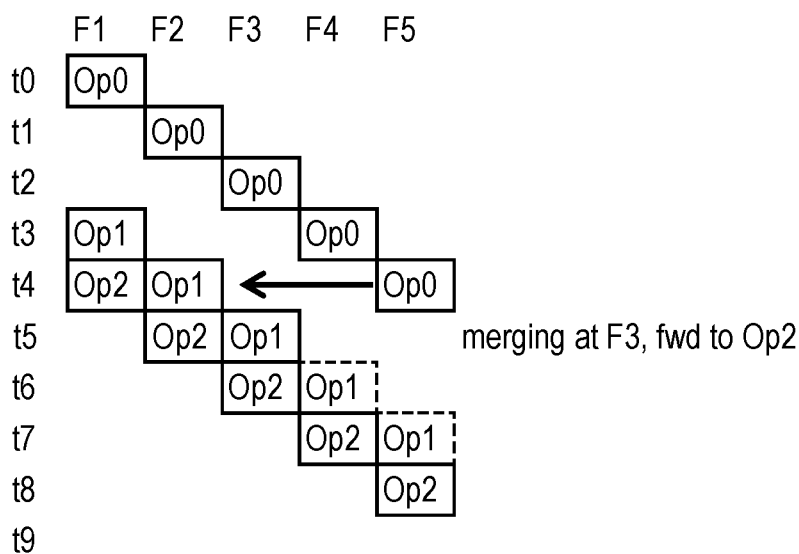

FIGS. 4 and 5 show two example sequences of instructions Op0, Op1, Op2 for illustrating this problem, in an approach where the merging predicated instruction (Op1) is a NOT instruction which has its processing result available by pipeline stage F3 (i.e. pipeline stage F3 is the "given pipeline stage" in this example).

In the example of FIG. 4, the NOT instruction Op1 uses a destination register Z3, and the value previously stored in the destination Z3 is generated by an earlier instruction Op0 which will not have its result ready until Op0 reaches pipeline stage F5. After instruction Op1, a subsequent instruction Op2 is dependent on Op1, because Op2 specifies as one of its source registers the destination register Z3 generated by Op1. Op2 is an ADD operation and it is assumed for sake of example that the source register Z3 for Op2 is required to be available by the time Op2 reaches pipeline stage F2.

Hence, in FIG. 4, the issue control circuitry 22 issues Op0 in cycle t0 and Op0 progresses down the pipeline until its result is generated in cycle t4 when Op0 is at pipeline stage F5. As Op1 depends on Op0 (because Op1 requires the previous value of its destination register Z3 to perform the merging operation), and the merging in this example is performed by the merging unit 48 provided at stage F3, the issue control circuitry 22 has to defer issuing Op1 until a cycle at which the availability of the destination register Z3 can be guaranteed to be available by the time Op1 reaches stage F3. As Op0 does not generate its result for Z3 until stage F5 in cycle t4, even with forwarding from Op0 to Op1 via forwarding path 46 the earliest cycle that Z3 could be available in pipeline stage F3 will be cycle t5. Hence, the earliest timing at which Op1 can be issued to stage F1 is in cycle t3, so that by the time it reaches stage F3 two cycles later, the previous value of Z3 has been forwarded from Op1 and the merging can be performed at pipeline stage F3. After performing the merging, Op1 continues to progress through the remaining pipeline stages F4 and F5 of the pipeline, so that the register write back for writing the merged result of Op1 back to the register bank 12 can still be performed when it reaches stage F5. However, stages F4 and F5 do not perform any computation as indicated by the dotted lines in FIG. 4.

For the subsequent dependent instruction Op2, as Op1 will not compute its merged result for destination register Z3 until stage F3 in cycle t5, and Op2 requires Z3 as a source operand at pipeline stage F2, the earliest Op2 can reach stage F2 is in cycle t6 (with forwarding of Z3 from Op1 to Op2 via the forwarding path 44 provided from pipeline stage F3). Therefore, the issue of Op2 will be delayed until cycle t5 so that Op2 reaches F2 in cycle t6. Op2 then progresses down the remaining stages F3-F5 in cycles t7-t9 respectively.

Hence, in the example shown in FIG. 4, the subsequent instruction Op2 which depends on Op1 does not reach the final pipeline stage F5 until cycle t9, 9 cycles after the cycle t0 in which Op0 was issued to the pipeline.

FIG. 5 shows a pipeline diagram for a second example in which Op0 and Op1 are the same as in FIG. 4, but Op2 is independent of Op1 as none of Op2's source registers are the same as the destination register of Op1. In this case, the issue control circuitry 22 controls the issue timing of Op0 and Op1 in the same way as in FIG. 4, but this time as Op2 is independent of Op1 it can be issued in the next cycle after Op1, so that it may reach stage F5 one cycle earlier than in FIG. 4.

FIGS. 4 and 5 show comparative examples of pipeline control, in which it is assumed that the merging operation for a merging predicated instruction should always be performed at the given pipeline stage where the processing result becomes available. In this case, if the previous value of the destination register of the merging predicated instruction Op1 cannot be ready in time for the given pipeline stage, issuing of the merging predicated instruction Op1 may be delayed, which may also impact subsequent dependent instructions such as Op2 shown in FIG. 4.

Figure 6:
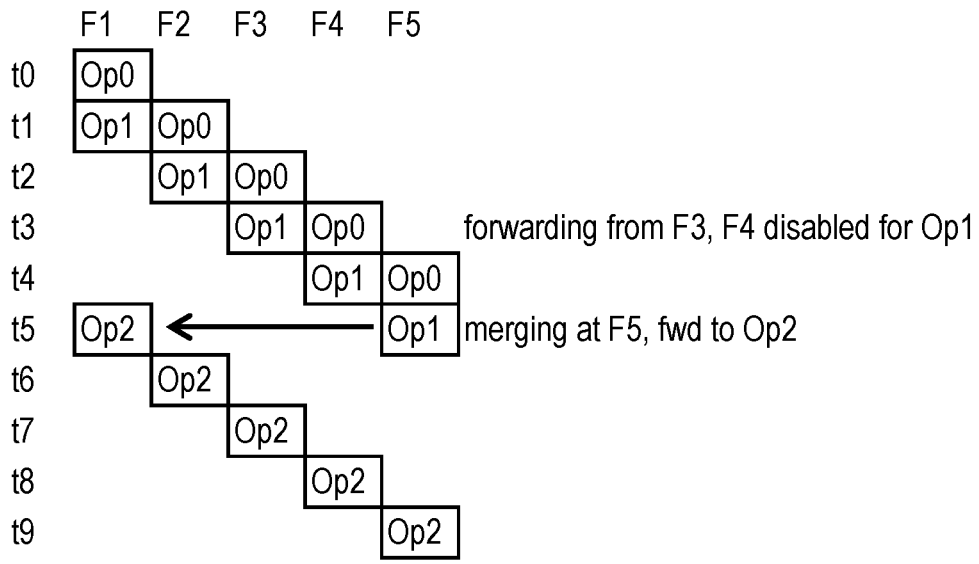
FIGS. 6 to 8 show examples of issue control where the merging predicated instruction is permitted to be issued to the processing pipeline with a timing which results in the previous value of the destination register still being unavailable when the instruction is at the pipeline stage at which the processing result is determined.
Figure 7:
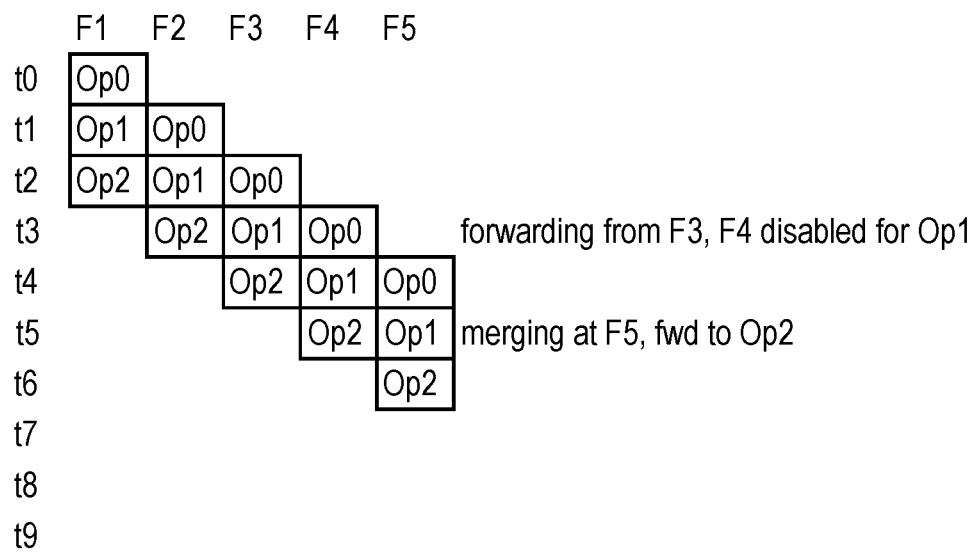
Figure 8:
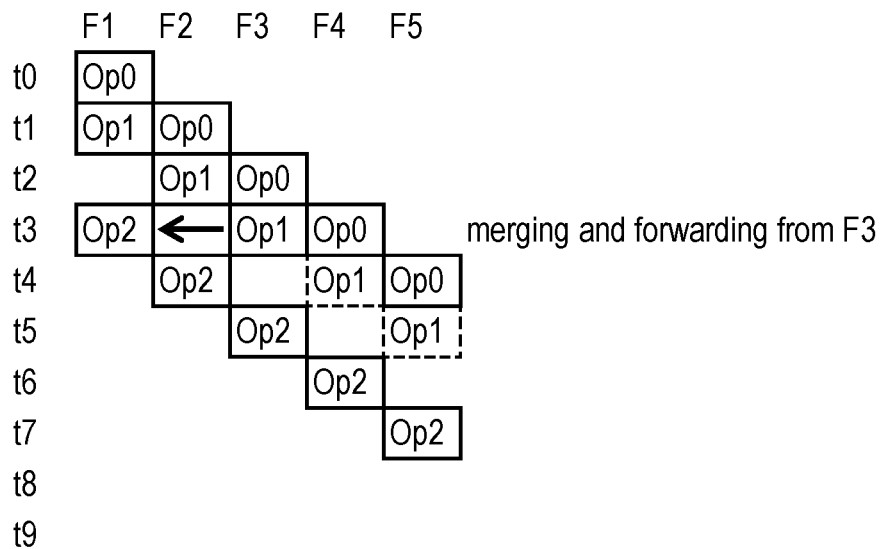

FIGS. 6 to 8 show a different approach where the issue control circuitry 22 allows the merging for a merging predicated instruction to be performed at a later pipeline stage to the given pipeline stage at which the processing result is calculated is used, and allows the merging predicated instruction to be issued with a timing which permits the previous value of the destination register still to be unavailable at the given pipeline stage.

With this approach, when a merging predicated instruction is received, the issue control circuitry 22 may determine whether the destination register will be available by the time the instruction reaches the stage (e.g. F3) at which the processing result is generated, if the instruction was issued in the next slot. If the destination register would be available in time for this pipeline stage, then (assuming any other operands are available or will be available by the time they are needed) the instruction can simply issued in the next available slot, and the merging is controlled to be performed at the same pipeline stage at which the processing result is generated, and the result can be forwarded early to a subsequent instruction.

However, unlike in FIGS. 4 and 5, in cases where the destination register will not be available in time for the stage (e.g. F3) at which the processing result is generated, the merging predicated instruction may nevertheless be permitted to be issued in the next available slot (again, assuming any other required operands will be available by the time they are needed), provided the destination register will be available by the time the instruction reaches a later pipeline stage F5 at which the merging can be performed. It may seem counter intuitive to defer the merging until later in the pipeline, as this may require a greater number of cycles between issue of the merging predicated instruction and its merged processing result is available, but in practice these additional cycles for the merging predicated instruction would in any case be incurred in delaying issue of the instruction if the approach of FIG. 4 had been taken. So in practice this increase the number of cycles between issue and the merged result being available does not in fact delay the availability of the merged result itself. However, by issuing the merging predicated instruction earlier, this can allow it to progress down the pipeline earlier to free up slots for subsequent instructions to be issued earlier. This is particularly beneficial in an in-order processing pipeline because it eliminates pipeline bubbles which cannot otherwise be filled with later instructions in a pipeline which uses in-order processing.

FIGS. 6 and 7 show the same example sets of instructions as in FIGS. 4 and 5 respectively, when processed with the modified approach discussed above.

Hence, FIG. 6 shows an example where Op2 is dependent on Op1 and the destination register for Op1 is not available because it is still being generated by Op0. In contrast to FIG. 4, with the approach in FIG. 6 the merging predicated instruction Op1 is issued in cycle t1, in the next available slot after Op0, even though its destination register Z3 will not be available by the time the instruction reaches the pipeline stage F3 at which Op1's processing result becomes available. Since the merging cannot be performed at pipeline stage F3 for instruction Op1, forwarding of the result of Op1 from pipeline stages F3 or F4 is disabled for Op1. Op1 instead progresses further down the pipeline and performs the merging at pipeline stage F5, at which point the forwarding path 46 can be used to forward the merged result to the subsequent dependent instruction Op2. Hence the issuing of Op2 is deferred until cycle t5 so that by the time Op2 reaches pipeline stage F2 it will have the merged result for register Z3 available in processing cycle t6. Note that in comparison to FIG. 4, there is no difference in timing for Op2—in both cases Op2 reaches pipeline stage F5 in cycle T9.

FIG. 7 shows the corresponding example to FIG. 5 in cases where the next instruction Op2 after the merging predicated instruction Op1 is independent of Op1. Op0 and Op1 are handled in the same way as in FIG. 6, with the merging operation performed for Op1 at stage F5 so that it can issue in cycle t1, immediately after Op0, to eliminate the pipeline bubble between Op0 and Op1 that is shown in FIG. 5. In FIG. 7, as Op2 is independent of Op1, it can issue in the next time slot after Op1, i.e. starting at stage F1 in cycle t2. Op2 progresses down the pipeline and reaches pipeline stage F5 at cycle t6, six cycles after the instruction Op0 was issued to the pipeline. Note that this is two cycles earlier than the cycle t8 in which Op2 would reach pipeline stage F5 in the example of FIG. 5.

Hence, from comparing FIG. 7 with FIG. 5, this shows that when the next instruction Op2 is independent of Op1, by issuing Op1 with a timing such that its destination register will not be available by the pipeline stage F3 at which its processing result is determined, and performing the merging later at stage F5, this enables the overall set of instructions Op0, Op1, Op2 to be processed faster than in the approach shown in FIG. 5. Nevertheless, the comparison of FIG. 6 with FIG. 4 shows that the same approach to controlling issue timing results in no change to the number of cycles taken to complete Op2 in cases when Op2 is dependent on Op1.

Hence, the approach discussed in this application achieves the performance benefit in the case when the next instruction is independent of the merging predicated instruction, and does not produce any negative result in cases when the next instruction deepens on the merging predicated instruction. Therefore, on average across a program as a whole, this approach can provide an overall increase in the throughput of instructions, providing a performance boost.

FIG. 8 shows another example of a set of instructions, in which in this example Op1 is independent of Op0 so that its destination registers Z4 is already available. In this case, Op1 can simply be issued in the next cycle after Op0 as it does not depend on Op0 in any way. As Op1's destination register is already available, and the NOT instruction is of a type for which the processing result is available early in processing stage F3, the processing result can be merged with the destination register at pipeline stage F3 and forwarded to the subsequent dependent instruction Op2, so that the dependent instruction Op2 can be processed faster than in the case shown in FIG. 6.

Figure 9:
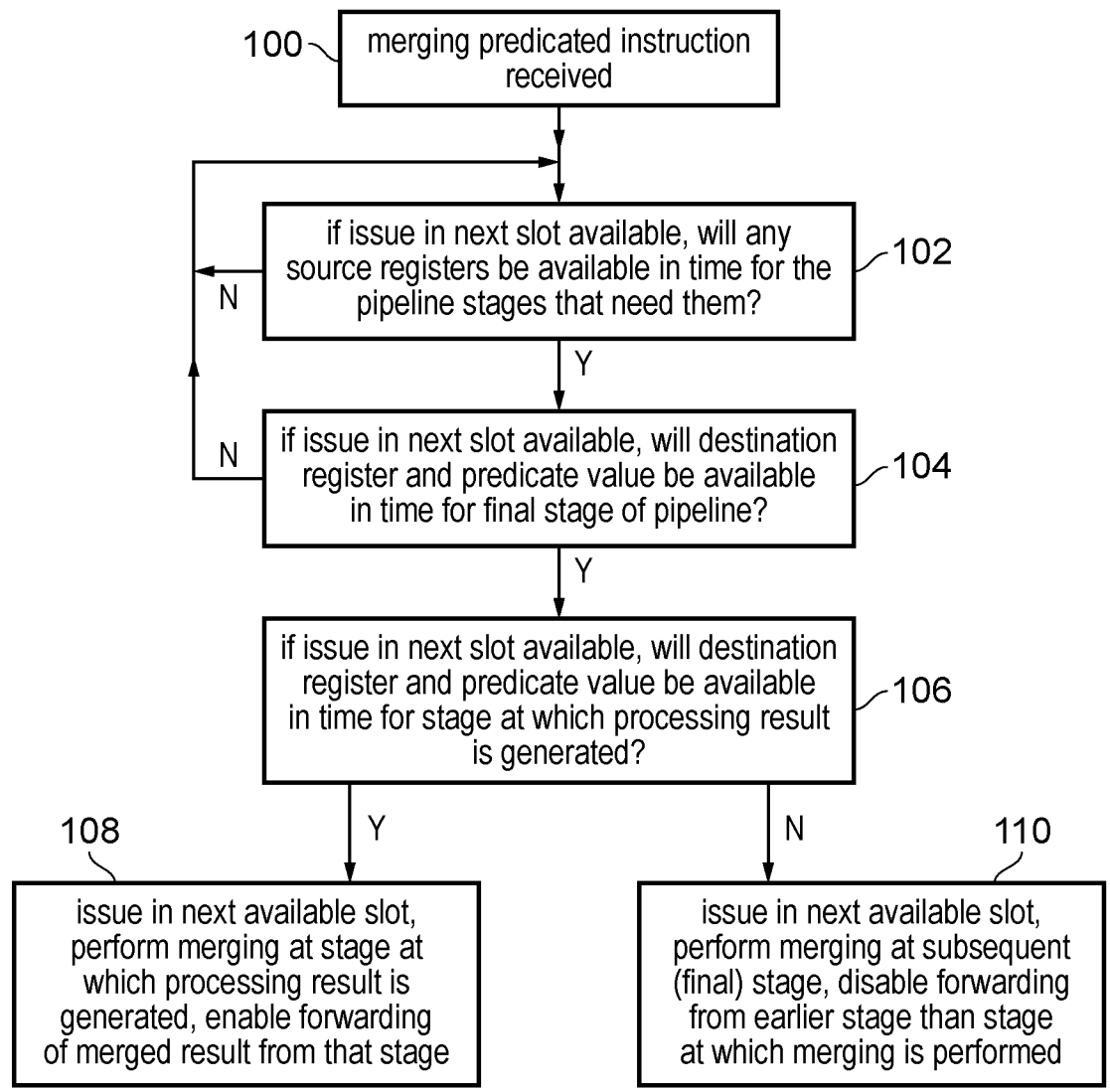
FIG. 9 is a flow diagram illustrating a method of controlling issue of a merging predicated instruction.

FIG. 9 is a flow diagram illustrating a method of controlling issue timing for merging predicated instructions. At step 100 a merging predicated instruction is received in the issue queue 24. For an in-order pipeline, the instruction cannot be issued until it is the oldest instruction remaining in the issue queue. For an out-of-order pipeline the instruction may be issued even if it is not the oldest instruction remaining, if it is independent of any older instruction.

At step 102 the issue control circuitry determines whether, if the merging predicated instruction was issued in the next timing slot available, any source registers required for the instruction would be available in time for the pipeline stages which need the values from those source registers. If any source register would not be available in time, then the instruction is not issued yet and the method loops round to await a subsequent processing cycle in which the instruction could be issued. In an in-order pipeline, this may cause a bubble in the pipeline, while in an out-of-order pipeline the bubble may be filled with a younger instruction which is independent of the merging predicated instruction.

If any source registers would be available in time for the pipeline stages that need them if the instruction was issued in the next available slot, then at step 104 it is determined whether if the instruction was issued in the next slot, the destination register and the predicate value for the instruction would be available in time for the final pipeline stage F5 of the pipeline, which may have a merging unit 48 suitable for performing the merging of the processing result of the instruction with the previous contents of the destination register. If the destination register and predicate value cannot be ready in time for that final pipeline stage, then again issuing of the instruction is deferred and the method loops back to step 102 until both the conditions shown in step 102 and 104 are satisfied.

When any source registers will be available in time for the stages that need them, and the destination register and predicate value will be available at least in time for the final stage F5 of the pipeline, then the merging predicated instruction can be issued to the pipeline. However the issue control circuitry may vary which stage of the pipeline is used to perform the merging operation, and whether forwarding of the result to subsequent instructions via the forwarding network 40 is enabled or disabled, based on the timing at which the destination register and predicate value will be available.

At step 106 the issue control circuitry determines whether, if the instruction was issued in the next slot available, the destination register and predicate value would be available in time for the given processing stage (e.g. F3) at which the processing result of the instruction would be generated. The particular stage at which the processing result is generated may vary between different types of instruction supported by the pipeline.

If the destination register and predicate value would be available in time for the stage at which the processing result is generated, then at step 108 the issue control circuitry 22 controls the instruction to be issued in the next available slot, and controls the pipeline so that the merging operation will be performed at the same pipeline stage (e.g. F3) at which the processing result is generated. The issue control circuitry 22 also enables forwarding of the merged result from the same pipeline stage at which the merging is performed. This may correspond to the scenario shown in FIG. 8.

In contrast, if at step 106 it is determined that if the instruction was issued in the next available time slot, the destination register and/or predicate value would not be available in time for the stage at which the processing result is generated, then at step 110 the instruction is nevertheless issued in the next available slot, even though it the merging therefore cannot be performed at the same pipeline stage where the processing result is generated. In this case the merging operation is instead controlled to be performed at a subsequent stage which is later in the pipeline then the given pipeline stage at which the processing result is generated. In the example of FIG. 3 this subsequent stage may be the final pipeline stage F5 which has a merging unit 48, but if merging units 48 are also provided in other pipeline stages such as pipeline stage F4, then the subsequent stage could also be an intermediate stage between the given stage at which the processing result is generated and the final stage. Early forwarding of the merged result of the instruction is disabled from any pipeline stage which is earlier in the pipeline than the stage at which the merging operation is performed. Step 110 corresponds to the scenario shown in FIGS. 6 and 7 in which the destination register Z3 was not available in time for Op1 to reach pipeline stage F3 at which its result is generated.

Hence, with this approach, while issuing the merging predicated instruction early may result in that individual instruction requiring a greater number of pipeline stages between issue and its merged result being available, this can enable a subsequent independent instruction, which does not require the result of the merging predicated instruction, to be processed earlier as shown in FIG. 7 compared to FIG. 5, to enable overall performance improvement.

In the example of FIG. 9, the availability of the predicate value is treated similar to the availability of the destination register, so that an instruction can be issued early even if its predicate value will not be available in time for the pipeline stage F3 at which the processing result is generated, with merging instead being deferred until later in the pipeline.

However, in other implementations the predicate value could be treated similar to the source registers discussed at step 102. In this case, an instruction could be prevented from issuing until a cycle in which it can be guaranteed that the predicate value will be available by the time the instruction reaches the pipeline stage F3 at which the processing result is generated. Although performance can be improved by treating the predicate value similar to the destination register, in practice the occasions when the predicate value is not available in time for stage F3 may be rare (as predicate values may change less often than destination registers). Therefore, some micro-architecture designers may choose not to provide additional logic for varying the point at which the predicate value is supplied to the pipeline, as this additional logic may not be considered justified. Hence, whether the predicate value is treated similar to the destination register or to the source registers may be an implementation choice and either approach can be used.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a processing pipeline comprising a plurality of pipeline stages for processing instructions; and
issue control circuitry to control a timing with which a given instruction is issued for processing by the processing pipeline; in which:

in response to a merging predicated instruction, the processing pipeline is configured to perform at a given pipeline stage a processing operation to determine a processing result based on at least one source operand, and to perform a merging operation to merge the processing result with a previous value of a destination register under control of a predicate value identifying, for each of a plurality of portions of the destination register, whether that portion of the destination register is to be set to a corresponding portion of the processing result or a corresponding portion of the previous value; and the issue control circuitry is configured to permit the merging predicated instruction to be issued to the processing pipeline with a timing which results in the previous value of the destination register still being unavailable when the merging predicated instruction is at the given pipeline stage at which the processing result is determined;

the issue control circuitry is configured to determine, based on whether the previous value of the destination register would be available in time for the merging predicated instruction reaching the given pipeline stage, whether the processing pipeline should perform both the processing operation and the merging operation at a same pipeline stage or perform the merging operation at a different pipeline stage than the given pipeline stage at which the processing operation is to be performed; and in response to a determination that the merging predicated instruction is issued to the processing pipeline with a timing which results in the previous value of the destination register still being unavailable when the merging predicated instruction is at the given pipeline stage, the issue control circuitry is configured to control the processing pipeline to perform the merging operation at a separate pipeline stage from the given pipeline stage, with the merging operation performed at a subsequent pipeline stage to the given pipeline stage at which the processing result is determined.

2. The apparatus according to claim 1, in which for the merging predicated instruction, the given pipeline stage is an earlier pipeline stage than a final pipeline stage of the processing pipeline.

3. The apparatus according to claim 1, in which the issue control circuitry is configured to vary which of the pipeline stages is selected to perform the merging operation for the merging predicated instruction, depending on availability of the previous value of the destination register.

4. The apparatus according to claim 1, comprising a forwarding network to forward a result value generated by the processing pipeline in response to a first instruction, for use as an input operand of a second instruction to be processed by the processing pipeline, to enable omission of a register read for reading the input operand of the second instruction from a register bank.

5. The apparatus according to claim 4, in which in response to the merging predicated instruction, the issue control circuitry is configured to control the forwarding network to disable forwarding of the result value from an earlier pipeline stage than a pipeline stage selected for performing the merging operation for the merging predicated instruction.

6. The apparatus according to claim 4, in which in response to the merging predicated instruction, the issue control circuitry is configured to determine whether the previous value of the destination register will be available when the merging predicated instruction is at the given pipeline stage at which the processing result is determined.

7. The apparatus according to claim 6, in which in response to determining that the previous value of the destination register will be available when the merging predicated instruction is at the given pipeline stage, the issue control circuitry is configured to control the given pipeline stage to perform the merging operation for the merging predicated instruction, and to enable forwarding of the result value from the given pipeline stage by the forwarding network.

8. The apparatus according to claim 6, in which in response to determining that the previous value of the destination register will be unavailable when the merging predicated instruction is at the given pipeline stage, the issue control circuitry is configured to control a subsequent pipeline stage to perform the merging operation for the merging predicated instruction, and to disable forwarding of the result value from the given pipeline stage by the forwarding network.

9. The apparatus according to claim 8, in which the subsequent pipeline stage comprises a final pipeline stage of the processing pipeline.

10. The apparatus according to claim 1, in which when the merging operation is performed at a subsequent stage of the pipeline to the given pipeline stage at which the processing result is determined for the merging predicated instruction, the merging operation comprises:
    reading the previous value of the destination register from a register bank or obtaining the previous value of the destination register from a forwarding network for forwarding a result of an earlier instruction processed by the pipeline;
    under control of the predicate value, merging the processing result determined by the given pipeline stage with the previous value read from the register bank or obtained from the forwarding network, to generate a merging result; and
    writing the merging result to an entire register of the register bank.

11. The apparatus according to claim 1, in which when the merging operation is performed at a subsequent stage of the pipeline to the given pipeline stage at which the processing result is determined for the merging predicated instruction, the merging operation comprises:
    writing one or more portions of the processing result determined by the given pipeline stage to corresponding portions of the destination register of the register bank, using the predicate value as a write enable value controlling enabling or disabling of writes to respective portions of the destination register in the register bank.

12. The apparatus according to claim 1, in which the issue control circuitry is configured to permit the merging predicated instruction to be issued to the processing pipeline with a timing which results in the predicate value still being unavailable when the merging predicated instruction is at a given pipeline stage at which the processing result is determined.

13. The apparatus according to claim 1, in which the processing pipeline comprises an in-order pipeline to perform in-order processing of the instructions.

14. An apparatus comprising:
    means for pipelined processing comprising a plurality of pipeline stages for processing instructions; and
    means for controlling a timing with which a given instruction is issued for processing by the means for pipelined processing; in which:

in response to a merging predicated instruction, the means for pipelined processing is configured to perform at a given pipeline stage a processing operation to determine a processing result based on at least one source operand, and to perform a merging operation to merge the processing result with a previous value of a destination register under control of a predicate value identifying, for each of a plurality of portions of the destination register, whether that portion of the destination register is to be set to a corresponding portion of the processing result or a corresponding portion of the previous value; and
    the means for controlling is configured to permit the merging predicated instruction to be issued to the means for pipelined processing with a timing which results in the previous value of the destination register still being unavailable when the merging predicated instruction is at a given pipeline stage at which the processing result is determined;
    the means for controlling is configured to determine, based on whether the previous value of the destination register would be available in time for the merging predicated instruction reaching the given pipeline stage, whether the means for pipelined processing should perform both the processing operation and the merging operation at a same pipeline stage or perform the merging operation at a different pipeline stage than the given pipeline stage at which the processing operation is to be performed;
    in response to a determination that the merging predicated instruction is issued to the means for pipelined processing with a timing which results in the previous value of the destination register still being unavailable when the merging predicated instruction is at the given pipeline stage, the means for controlling is configured to control the means for pipeline processing to perform the merging operation at a separate pipeline stage from the given pipeline stage, with the merging operation performed at a subsequent pipeline stage to the given pipeline stage at which the processing result is determined.

15. A data processing method, comprising:
    processing instructions using a processing pipeline comprising a plurality of pipeline stages; and
    controlling a timing with which a given instruction is issued for processing by the processing pipeline; in which:
    in response to a merging predicated instruction, the processing pipeline performs a processing operation at a given pipeline stage to determine a processing result based on at least one source operand, and performs a merging operation to merge the processing result with a previous value of a destination register under control of a predicate value identifying, for each of a plurality of portions of the destination register, whether that portion of the destination register is to be set to a corresponding portion of the processing result or a corresponding portion of the previous value; and
    the merging predicated instruction is permitted to be issued to the processing pipeline with a timing which results in the predicate value still being unavailable when the merging predicated instruction is at a given pipeline stage at which the processing result is determined;
    determining, based on whether the previous value of the destination register would be available in time for the merging predicated instruction reaching the given pipeline stage, whether the processing pipeline should perform both the processing operation and the merging operation at a same pipeline stage or perform the merging operation at a different pipeline stage than the given pipeline stage at which the processing operation is to be performed; and in response to a determination that the merging predicated instruction being issued to the processing pipeline with a timing which results in the previous value of the destination register still being unavailable when the merging predicated instruction is at the given pipeline stage, controlling the processing pipeline to perform the merging operation at a separate pipeline stage to the given pipeline stage, with the merging operation performed at a subsequent pipeline stage to the given pipeline stage at which the processing result is determined.

* * * * *